US011296907B2

(12) United States Patent
Qu

(10) Patent No.: US 11,296,907 B2
(45) Date of Patent: Apr. 5, 2022

(54) SYSTEMS AND METHODS FOR TRANSITIONING OF VIRTUALIZED TRANSPORT NETWORKS

(71) Applicant: ARISTA NETWORKS, INC., Santa Clara, CA (US)

(72) Inventor: Hui Qu, Austin, TX (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 16/991,248

(22) Filed: Aug. 12, 2020

(65) Prior Publication Data

US 2022/0052876 A1 Feb. 17, 2022

(51) Int. Cl.
| | |
|---|---|
| *G06F 15/173* | (2006.01) |
| *H04L 12/46* | (2006.01) |
| *H04L 29/06* | (2006.01) |
| *H04L 61/251* | (2022.01) |

(52) U.S. Cl.
CPC ........ *H04L 12/4633* (2013.01); *H04L 61/251* (2013.01); *H04L 63/0272* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 8,798,060 B1* | 8/2014 | Vautrin ............... | H04L 61/2528 370/392 |
| 2017/0019331 A1* | 1/2017 | Yong ...................... | H04L 45/64 |
| 2018/0013584 A1* | 1/2018 | Shen .................. | H04L 12/4633 |
| 2018/0198754 A1* | 7/2018 | Kielhofner ............ | H04L 65/608 |
| 2018/0287929 A1* | 10/2018 | Means .................... | H04L 45/02 |
| 2020/0021613 A1* | 1/2020 | Tong ........................ | H04L 45/04 |

* cited by examiner

*Primary Examiner* — Phyllis A Book
(74) *Attorney, Agent, or Firm* — Fountainhead Law Group P.C.

(57) ABSTRACT

Systems and methods are provided herein for an efficient method of tunneling that enables a network to transition from one address family to another address family with a reduction in traffic loss. This may be accomplished by updating network devices to support a second address family in addition to a first address family. Once the second address family is supported by the network devices, tunnel endpoints using those network devices can establish a second tunnel based on the second address family. As the second tunnel is established, the network continues to use a first tunnel to route network traffic while the first tunnel uses the first address family.

20 Claims, 5 Drawing Sheets

SYSTEMS AND METHODS FOR TRANSITIONING OF VIRTUALIZED TRANSPORT NETWORKS

BACKGROUND

The present disclosure relates to network virtualization, and in particular to methods and systems for transitioning of transport networks.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
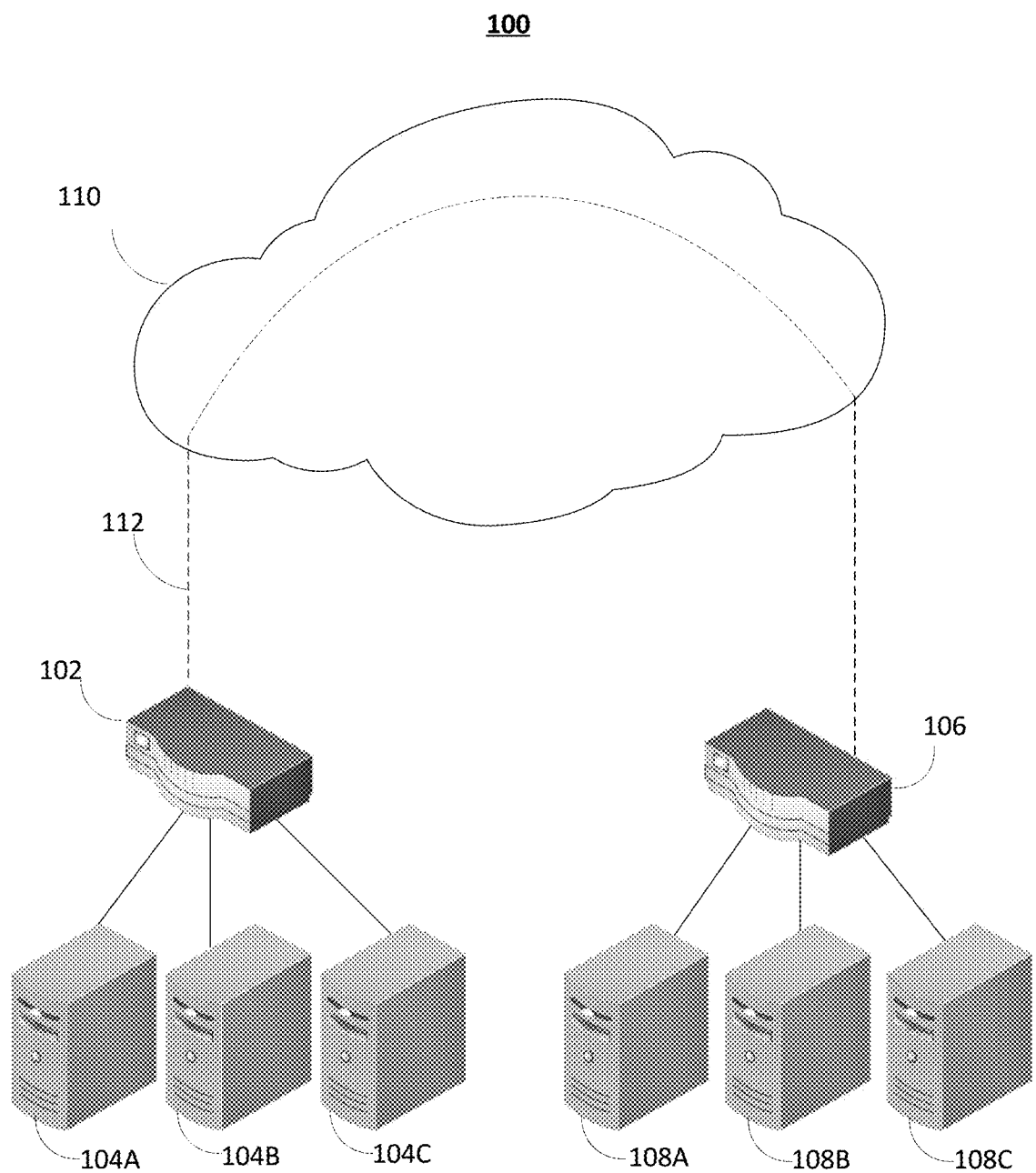
FIG. 1A shows an illustrative network topology of a system for transitioning a transport network in an EVPN environment, in accordance with some embodiments of the disclosure.

Network virtualization is the ability to decouple the physical topology from a virtual topology using methods such as tunneling. The physical topology or underlay network is the physical infrastructure that transports data packets across the network. The virtual topology or overlay network is built on top of the underlay network and is a virtual transport network of nodes and logical links where multiple layers of network abstraction can be created. The transport network is able to control the sequence of overlay nodes a data packet traverses before reaching its destination. By decoupling the underlay network from applications, network-wide virtualization can optimize computing and storage resources. Network virtualization has become a central, and even essential, part of organizations' network design.

Tunneling methods aid in network virtualization and provide a simple interface for the transport networks. Tunnels can be established between virtual endpoints (i.e., routers) in the underlay network, allowing for movement of data across a network or from one network to another in the overlay network. For example, one or more tunnels can be used to create a Virtual Private Network (VPN) over public data networks. To establish a tunnel between two virtual endpoints, the internet protocol (IP) addresses reachable by the endpoints are known. IP addresses are numerical labels assigned to each device connected to a network that uses IP to communicate. Two versions of IP addresses include IP version 4 (IPv4) and IP version 6 (IPv6). IPv4 defines an IP address as a 32-bit number which provides for over four billion unique addresses. However, as the internet continues to grow, the depletion of available IPv4 address resulted in the development of IPv6 addresses. IPv6 defines an IP address as 128 bits (providing approximately $3.403 \times 10^{38}$ unique addresses) allowing for vastly more addresses. Many networks use only a single version of an address family (i.e., IPv4 or IPv6).

Due to specific network requirements or technological advancements, it is sometimes necessary for networks to transition from using one address family to another address family. For example, it may be necessary for a network having a tunnel using IPv4 family addresses to transition to a tunnel using IPv6 family addresses. In the past, this transition started with shutting down the original tunnel that uses the IPv4 addresses and then proceeded to create a new tunnel using the IPv6 family addresses. To create a new tunnel using the IPv6 addresses, the switching devices transitioned from using the old address family to using the new address family. As the new tunnel was created and the switching devices were transitioned, data traffic was unable to flow, resulting in prolonged outages and loss of data traffic.

Various systems and methods described herein address these problems by providing an efficient method of tunneling that enables a network to transition from one address family to another address family with a reduction in traffic loss. In some embodiments, a second tunnel, using a second version of family addresses, is established while a first tunnel using a first version of family addresses remains open. As the second tunnel is established, the network continues to use the first tunnel to route network traffic. To establish the second tunnel, switching devices are updated to support the second address family in addition to the first address family. Once the second address family is supported by the switching devices, tunnel endpoints using those switching devices can establish the second tunnel based on the second address family while keeping the first tunnel running using the first address family. Once the second tunnel is established, the network stops using the first tunnel and will exclusively route traffic using the second tunnel. After the first tunnel is not used for a predetermined amount of time, the network resources that supported the first tunnel can be reallocated. This approach allows network traffic to continue to flow as a network transitions to a new address family.

FIG. 1A shows an illustrative network topology of a system 100 for transitioning a transport network in an EVPN environment. The system includes devices (e.g., routers, switches, host) 102, 104A-C, 106, and 108A-C. In some embodiments, links between devices 102, 104A-C, 106, and 108A-C may be an overlay of virtual links configured over an underlay of physical devices. Although an EVPN environment is shown, the methods described herein may be used in other network configurations that use VPNs, virtual private LAN services (VPLSs), and similar such technologies.

System 100 is shown having two routing devices: router 102 and router 106. While routing devices 102, 106 are referred to as routers herein, other devices may be used that perform similar functions, for example, network switches. System 100 also includes two groups of host devices being served by the routers. The first group, serviced by router 102, includes hosts 104A-C, while the second group, serviced by router 106, includes hosts 108A-C. In some embodiments, the first and second groups of hosts may belong to the same virtual or overlay VPN network. In some embodiments, router 102 and router 106 may also serve other virtual or overlay VPN networks not shown in the figures. In system 100, each host has its own Layer 2 address (e.g., MAC address). One skilled in the art would understand that the same techniques described herein may be used by a system containing any suitable number of devices. In some embodiments, system 100 may be a Multiprotocol Label Switching (MPLS)-based EVPN in which the network nodes (e.g., routers 102 and 106, as well as other devices not shown in FIG. 1) maintain an EVPN Border Gateway Protocol (BGP) session. In some embodiments, system 100 may use Virtual Extensible LAN (VXLAN) and similar network virtualization technology to build tunnels.

In the shown embodiment, router 102 and router 106 have direct connections to their respective groups of hosts. In some embodiments, router 102 and router 106 are eligible to receive network traffic (e.g., network packets) from their respective groups of hosts and route the network traffic via links across the cloud 110 (e.g., inter-connected servers such as the internet). For example, if router 102 receives a network packet from host 104B, where the network packet is to be sent to host 108B, router 102 will forward the packet to router 106 across the cloud 110. It should be understood that the cloud 110 is simply an abstraction of any number of interconnected devices (e.g., switches, routers, servers, and similar such devices) that are used to route network traffic.

In the shown embodiment, routers 102 and 106 have established a tunnel 112. In some embodiments the tunnel is used to support a VPN over the cloud 110. The tunnel 112 is established between routers 102 and 106, where the routers are used as virtual endpoints for the tunnel 112. In one embodiment, to establish the tunnel 112, the routers 102 and 106 exchange routing and reachability information among the various devices within the VPN. The routing and reachability information can include MAC/IP routes for the hosts, which are reachable by the device broadcasting the routes. The routing and reachability information also includes the IP address of the router broadcasting the routing and reachability information. For example, the routing and reachability information advertised by router 102 would include the MAC/IP routes of hosts 104A-C and the IP address for the router 102, which services hosts 104A-C, where the IP address of router 102 is described in an IPv4 format. The routing and reachability information advertised by router 106 would include the MAC/IP routes of hosts 108A-C and the IP address for the router 106, which services hosts 108A-C, where the IP address of router 106 is described in an IPv4 format. Router 102 and router 106 use the information received from one another to establish the tunnel 112.

Once the tunnel 112 is established, router 102 and router 106 can transmit network traffic received from their respective groups of hosts and route the network traffic via the tunnel 112. In some embodiments, the tunnel 112 may use an MPLS Label Switched Path (LSP) infrastructure, which provides the benefits of MPLS technology, such as fast reroute, resiliency, etc. In some embodiments, the tunnel 112 may use Generic Routing Encapsulation tunneling, IP tunneling, VXLAN, or other suitable tunneling methodologies.

In one approach, it may be necessary for a network to transition from using one type of IP address family for the tunneling endpoints to another type of address family (e.g., switching from IPv4 addresses to IPv6 addresses) for tunneling. When a network transitions from using one type of IP address family to another type of address family for the tunneling endpoints, not all the devices can transition at once. To begin transitioning a network, a first device (e.g., router), used as a first tunneling endpoint, will switch the IP address of the tunneling endpoint, e.g., from the IPv4 format to the IPv6 format. Traditionally, when the IP address of the first tunneling endpoint switches, the first device no longer supports the old address for tunneling, in this case, the IPv4 address. This causes network traffic, routed to the first device using a tunnel, where the tunnel uses the old IPv4 address of the first device, to no longer be received and routed by the first device. For example, if a second network device sends a network packet to the first device through a tunnel that uses the old IPv4 address of the first device, the network packet will be dropped or bounced as the first device is no longer configured to support the old IPv4 address. Accordingly, any tunnel using the old IPv4 address of the first device will no longer be functional. For example, if router 106 switched to an IPv6 address format while router 102 is still routing traffic to router 106 through tunnel 112, which uses the old IPv4 address format, the network traffic destined for router 106 will be dropped or bounced because router 106 no longer enables routing of network traffic directed to the old IPv4 address. Accordingly, tunnel 112 will no longer function properly.

Another problem with the traditional network transition process is that when a first device switches address families for tunneling, said first device can no longer use the old IPv4 address to send traffic for tunneling. In an example, a first host sends a network packet to the first device, where the first device is using the IPv6 address family for tunneling. The destination of the network packet is a second network device, which is reachable through a tunnel that uses the old IPv4 address. In this example, the first device will not be able to route the packet through the tunnel because it has switched to the new IPv6 address family for tunneling while the second device is still using the old IPv4 address. For example, if router 106 switched to an IPv6 address format and received a network packet from host 108A, destined for host 104A that is serviced by router 102, router 106 cannot use tunnel 112 to route the network packet to router 102, because router 102 is still using the IPv4 address for tunneling. In an embodiment, this will cause the network packet to be dropped, making tunnel 112 nonfunctional. Once router 102 is updated to use the IPv6 address format, the switching devices can again exchange routing and reachability information in order to create a new tunnel using the IPv6 family addresses. Only after these steps are completed will the functionality of system 100 recover. As this process is happening, network traffic is unable to flow, resulting in prolonged outages and loss of data traffic.

Figure 1B:
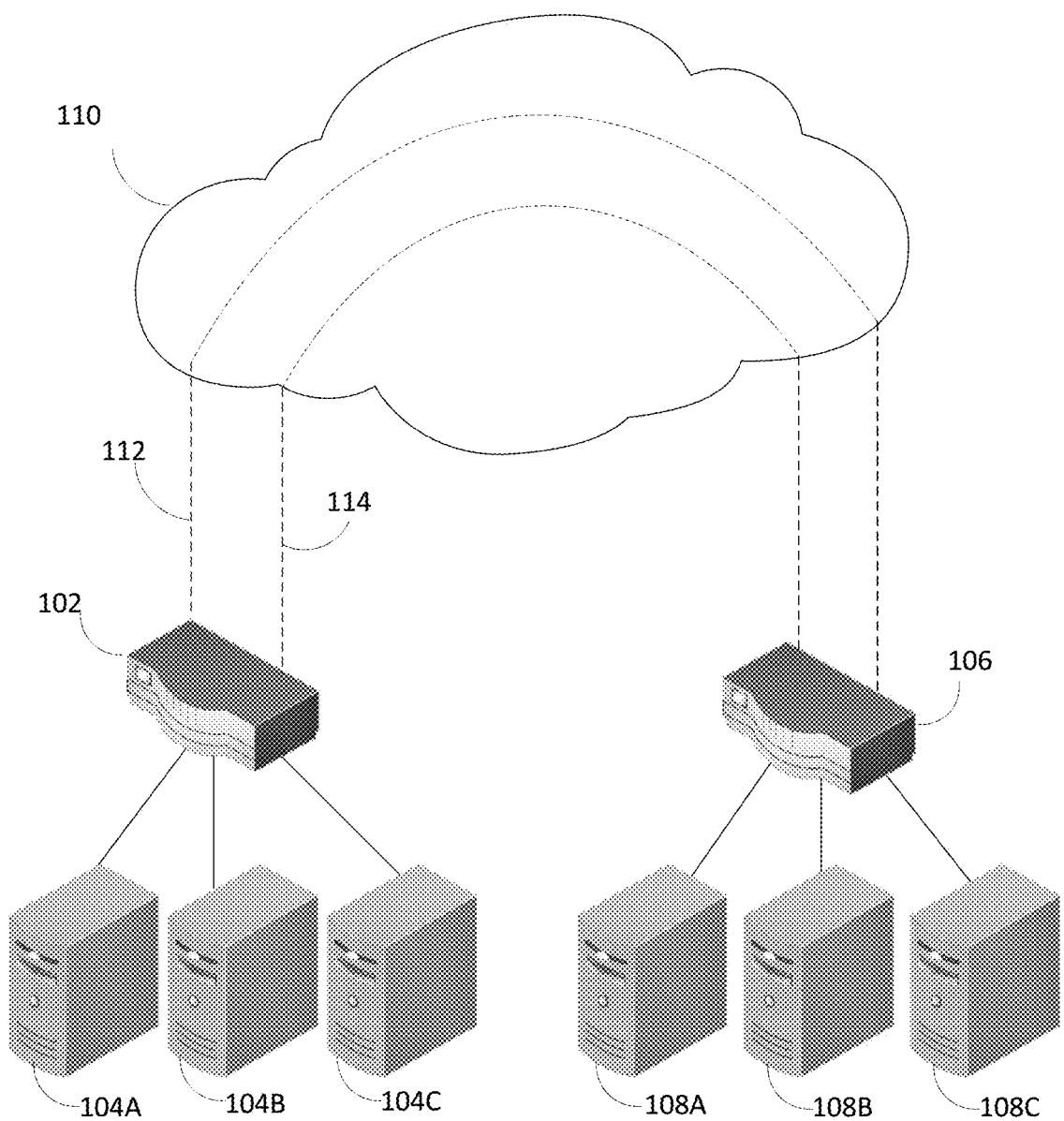
FIG. 1B shows another illustrative network topology of a system for transitioning a transport network in an EVPN environment, in accordance with some embodiments of the disclosure.

To overcome these problems, FIG. 1B illustrates an example of an improved tunneling method that enables a network to transition from one address family to another address family with a reduction in traffic loss. FIG. 1B shows an illustrative network topology of a system 150 for transitioning a transport network in an EVPN environment. The system includes devices (e.g., routers, switches, host) 102, 104A-C, 106 and 108A-C. System 150 may have the same devices and links as shown in system 100 except for the addition of tunnel 114.

It may be necessary for a system 150 to transition from using one type of IP address family to another type of address family (e.g., switching from IPv4 addresses to IPv6 addresses). To begin transitioning, router 106 will switch to a new IP address in the IPv6 format. However, when router 106 switches to the IPv6 address it will still be configured to enable routing of network traffic destined for router 106's old IPv4 address. In some embodiments, router 106 enables a dual stack in order to be able to send and receive network traffic using both the old and new IP addresses. In an embodiment, this may require additional resources (e.g., increased load, more memory, etc.), but this allows network traffic destined for router 106, using the old IPv4 address, to arrive at and be processed by router 106. For example, if router 102 transmits a network packet to router 106 using the old IPv4 address, even though router 106 has already switched to the new IPv6 address, router 106 will still receive and process the network packet. Accordingly, tunnel 112, which was established between router 102 and router 106 as discussed in FIG. 1A, will be able to continue to function even after router 106 switches to the IPv6 format. In some embodiments, after router 106 enables dual stack functionality, it advertises routing and reachability information for its tunnel endpoints using both the old (e.g., IPv4) and new (e.g., IPv6) IP addresses, indicating that router 106 has dual stack processing capabilities.

In an embodiment, router 102 receives routing and reachability information from router 106, where the routing and reachability information includes IP addresses for router 106's tunnel endpoints using both the old (e.g., IPv4) and new (e.g., IPv6) IP addresses. Because router 102 has not yet switched to the new IPv6 address format, it will not use the IPv6 address. Instead, router 102 will continue using the old IPv4 address thus maintaining tunnel 112. As the system 150 continues to transition from using one type of IP address family to another type of address family, router 102 will eventually switch to the IPv6 address format. In an embodiment, when router 102 switches to the IPv6 address it will still be configured to enable receiving network traffic destined for router 102's old IPv4 address. In some embodiments, router 102 enables a dual stack in order to be able to send and receive network traffic using both the old and new IP addresses. In an embodiment, this may require additional resources, but this allows network traffic destined for router 102, using the old IPv4 address, to arrive at and be processed by router 102. For example, if router 106 transmits a network packet to router 102 using router 102's old IPv4 address, router 102 will still receive and process the network packet. Accordingly, tunnel 112, which was established between router 102 and router 106 as discussed in FIG. 1A, will be able to continue to function even after router 106 switches to the IPv6 address.

In an embodiment, once both router 102 and router 106 switch to the IPv6 format they will establish a second tunnel 114, where the routers are used as virtual endpoints for tunnel 114. In one embodiment, to establish tunnel 114, routers 102 and 106 exchange routing and reachability information among the various devices within the VPN. In some embodiments, after router 102 enables dual stack functionality, it advertises routing and reachability information for its tunnel endpoints using both the old (e.g., IPv4) and new (e.g., IPv6) IP addresses, indicating that router 102 has dual stack processing capabilities. The routing and reachability information can include MAC/IP routes for the hosts, which are reachable by the device broadcasting the routes. For example, the routing and reachability information advertised by router 102 would include the MAC/IP routes of hosts 104A-C and the IP addresses for the router 102, which services hosts 104A-C, where the IP addresses of router 102 are described in an IPv4 and IPv6 format. The routing and reachability information advertised by router 106 would include the MAC/IP routes of hosts 108A-C and the IP address for router 106, which services hosts 108A-C, where the IP addresses of router 106 are described in an IPv4 and IPv6 format. Router 102 and router 106 use the information received from one another to establish tunnel 114, which uses the IP addresses of router 102 and router 106 in an IPv6 format.

Once tunnel 114 is established, router 102 and router 106 can transmit network traffic received from their respective groups of hosts and route the network traffic via tunnel 114. In an embodiment, for a period of time tunnel 112 and tunnel 114 are both used to transmit network traffic. For example, if router 102 receives a network packet destined for a host serviced by router 106, router 102 is able to transmit the network packet to router 106 using tunnel 114, which uses router 106's IP address in the IPv6 format. In another example, if router 106 receives a network packet destined for a host serviced by router 102, router 106 is able to transmit the network packet to router 102 using tunnel 112, which uses router 102's IP address in the IPv4 format.

System 150 allows for tunnel 112 and tunnel 114 to be operational where both tunnels may be used to transmit network packets at the same time. In an embodiment, having both tunnels operational for a period of time prevents dropped or lost network traffic. In an example, router 102 has not switched to the IPv6 address format and router 106 has switched to the IPv6 address format but router 106 is still configured to enable routing of network traffic destined for router 106's old IPv4 address. In said embodiment, tunnel 112 is still operational. In said embodiment, when router 102 switches to the IPv6 address format, tunnel 114 can be established. If, in response to tunnel 114 being established, router 102 and router 106 immediately stop using tunnel 112, network traffic will be dropped or lost because network traffic may be sent using tunnel 112 as router 102 switches address formats. For example, router 106 sends a network packet through tunnel 112 to router 102, and as the network packet is traveling through the tunnel, router 102 switches to the IPv6 address format. Once the network packet arrives at router 102, which has switched to the IPv6 address format, the network packet will not be properly processed unless the old tunnel 112 is still supported by router 102. This is one example why having both tunnels operational for a period of time prevents dropped or lost network traffic.

In some embodiments, either automatically or as the result of a user input, router 106 and router 102 will stop routing traffic using tunnel 112, which uses router 102 and router 106's IP addresses in the IPv4 format. As a result, router 102 and router 106 will route traffic using only tunnel 114, which uses router 102 and router 106's IP addresses in the IPv6 format. Accordingly, router 102 and router 106 will no longer use tunnel 112 to transmit network packets. After tunnel 112 is not used for a predetermined amount of time (e.g., five minutes, ten minutes, two hours, etc.) or in response to user input, the network resources that support tunnel 112 will be reallocated. For example, router 106 will no longer be configured to enable the receiving and routing of network traffic destined for router 106's old IPv4 address. Accordingly, this may reduce processing power requirements, load requirements, memory requirements, and similar such resource requirements that were needed to support receiving and routing network traffic destined for router 106's old IPv4 address. Similarly, router 102 will no longer have to be configured to enable receiving and routing of network traffic destined for router 102's old IPv4 address. This described process allows network traffic to continue to flow as the system transitions from using one address family to a different address family.

In some embodiments, routers with dual stack functionality may have a preferred IP address format. In an example, router 102 and router 106 both have dual stack functionality and do not have any existing tunnels between them. When router 102 and router 106 exchange routing and reachability information for their respective tunnel endpoints, they will advertise tunnel endpoints using two or more IP address formats (e.g., IPv4 and IPv6). In some embodiments, router 102 and router 106 will prefer IP addresses in an IPv6 format. Accordingly, router 102 and router 106 will choose to establish tunnel 114, which uses the IP addresses of router 102 and router 106 in an IPv6 format, despite having the information to establish a tunnel using the IPv4 IP addresses. In another embodiment, router 102 and router 106 may be configured to establish both tunnel 112 and tunnel 114.

Figure 2:
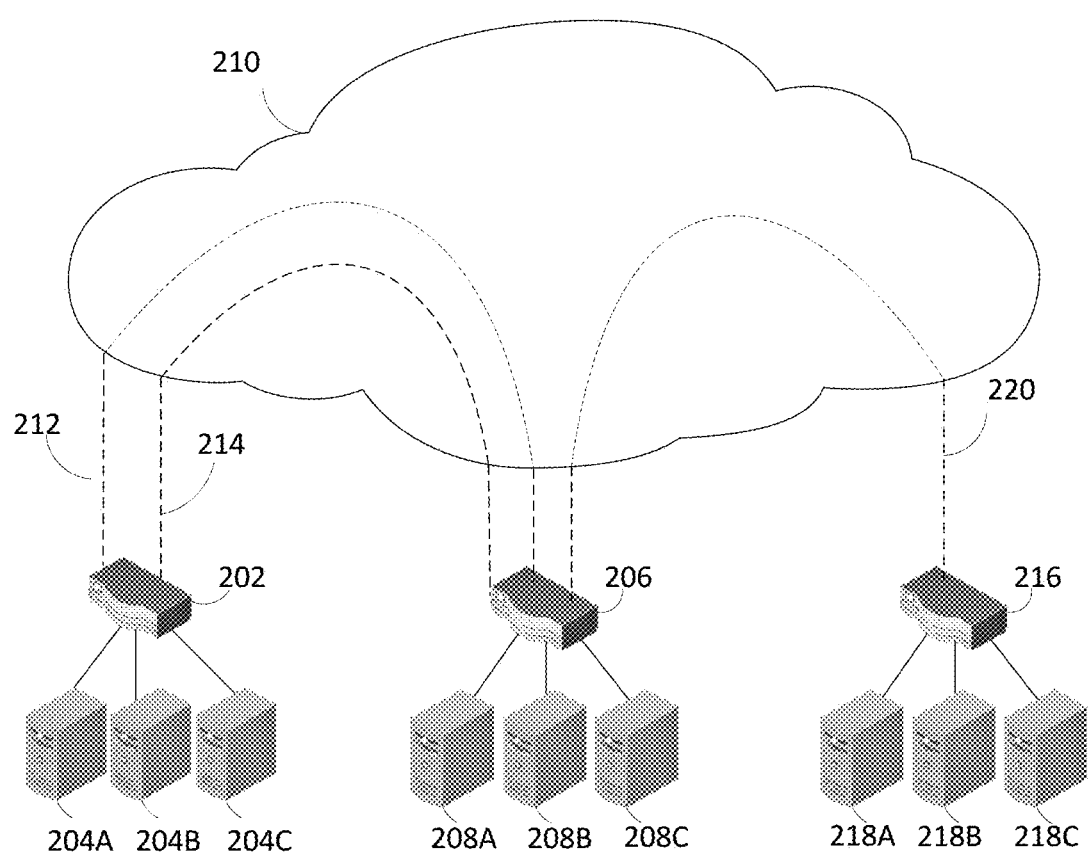
FIG. 2 shows another illustrative network topology of a system for transitioning a transport network in an EVPN environment, in accordance with some embodiments of the disclosure.

FIG. 2 illustrates an example of an improved tunneling method that enables a network to transition from one address family to another address family with a reduction in traffic loss. FIG. 2 shows an illustrative network topology of a system 200 for transitioning a transport network in an EVPN environment. The system includes devices (e.g., routers, switches, host) 202, 204A-C, 206, 208A-C, 216, and 218A-C. System 200 may have devices and links similar to those shown in system 150.

In an embodiment, using the methods described above, both router 202 and router 206 have switched to the IPv6 format and have established a second tunnel 214 using the IPv6 format, where the routers are used as virtual endpoints for tunnel 214. Additionally, router 202 and router 206 still maintain a first tunnel 212 using the IPv4 format in addition to the second tunnel 214 for a period of time. System 200 is shown as also having a third router 216, which uses an IPv4 family address and services a group of hosts 218A-C. In an embodiment, router 216 establishes a third tunnel with router 206 after router 206 has switched to the IPv6 format. For example, after router 206 enables dual stack functionality, router 206 advertises routing and reachability information for its tunnel endpoints using both the old (e.g., IPv4) and new (e.g., IPv6) IP addresses, indicating that router 206 has dual stack processing capabilities. Router 216 receives the routing and reachability information advertised by router 206 and uses the IPv4 address to communicate with router 206 because router 216 has not switched to the IPv6 format. Router 216 advertises routing and reachability information among the various devices (e.g., router 202, router 206) within the VPN. The routing and reachability information advertised by router 216 includes MAC/IP routes of hosts 218A-C and the IP address for tunnel endpoints of router 216, which services hosts 218A-C, where the IP address of the tunnel endpoints of router 216 are described in an IPv4 format. As described above, router 206 has enabled dual stack functionality and determines that it will communicate with router 216 using IP addresses in the IPv4 address format. This is based, in part, on the routing and reachability information advertised by router 216. Router 206 and router 216 use the information received from one another to establish tunnel 220, which uses IP addresses in an IPv4 address format.

Once tunnel 220 is established, router 206 and router 216 can transmit network traffic received from their respective groups of hosts and route the network traffic via tunnel 220. In an embodiment, for a period of time tunnel 212, tunnel 214, and tunnel 220 are all operational. For example, if router 206 receives a network packet destined for a host serviced by router 202, router 206 is able to transmit the network packet to router 202 using tunnel 214, which uses router 202's IP address in the IPv6 format. In another example, if router 206 receives a network packet destined for a host serviced by router 216, router 206 is able to transmit the network packet to router 216 using tunnel 220, which uses router 216's IP address in the IPv4 format.

Figure 3:
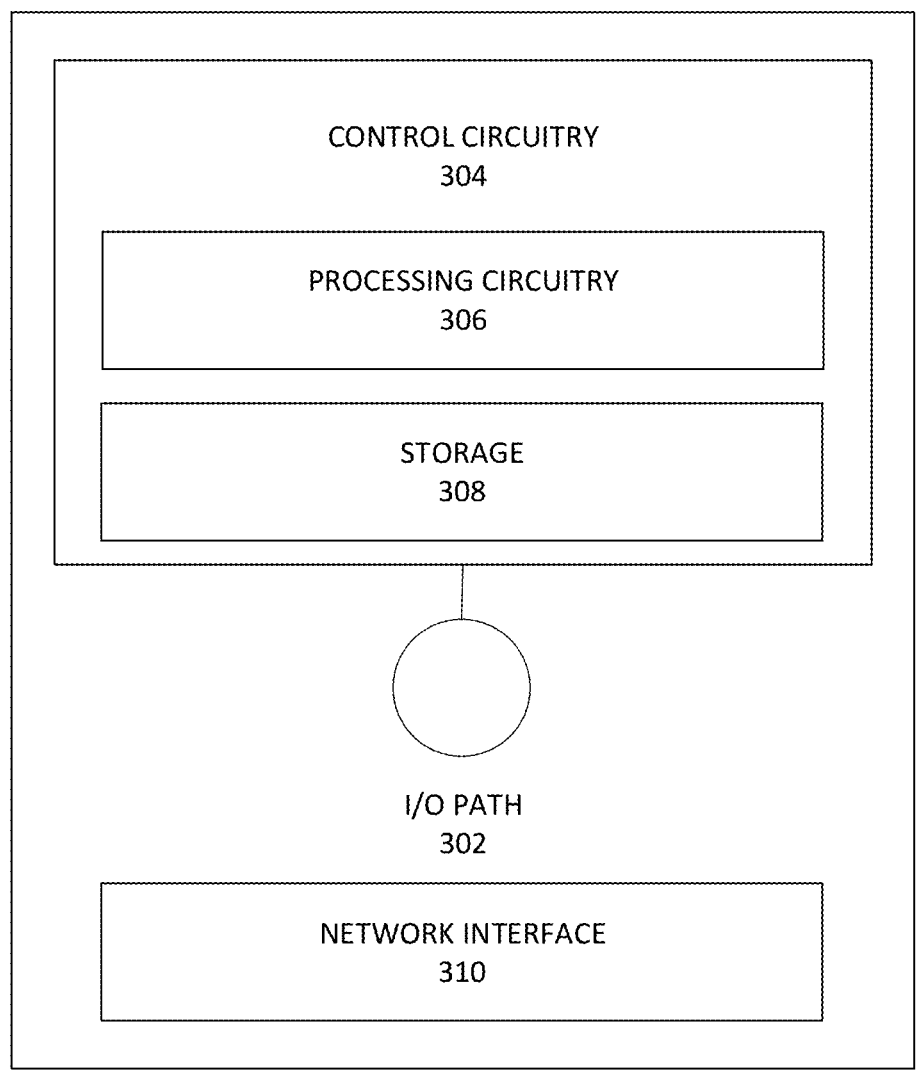
FIG. 3 shows a diagram of an illustrative network device for transitioning a transport network in an EVPN environment, in accordance with some embodiments of the disclosure.

FIG. 3 shows a generalized embodiment of a network device usable in a system for transitioning a transport network in an EVPN environment, in accordance with some embodiments of the disclosure. In particular, device 300 of FIG. 3 may be any of the devices depicted in FIGS. 1A, 1B, and 2 (e.g., devices 102, 104A-C, 106, 108A-C, 202, 204A-C, 206 208A-C, 216, and 218A-C) or may be a physical or virtual device hosting any of physical or virtual devices 102, 104A-C, 106, 108A-C, 202, 204A-C, 206 208A-C, 216, and 218A-C. Device 300 may be a router, an L3 switch, an L2 router, or a host, and/or any other computing device that may be configured to participate in EVPN switching or routing. Device 300 may receive data via data network interfaces 310 and provide the received data to control circuitry 304 via an input/output (I/O) path 302. Control circuitry 304 includes processing circuitry 306 and storage 308. Storage 308 may include volatile memory (such as random-access memory (RAM), for example, static RAM and/or dynamic RAM), which does not retain its contents when power is turned off, and non-volatile memory (such as, for example, a solid state drive (SSD), a hard disk drive (HDD), electrically erasable programmable read-only memory (EEPROM), etc.), which does retain its contents when power is turned off. Control circuitry 304 may send and receive commands, requests, and other suitable data using I/O path 302. As noted above, I/O path 302 connects control circuitry 304 (and specifically processing circuitry 306) to network interface 310, which in turn connects device 300 to one or more other devices. For example, I/O path 302 may provide route packets to next hops listed in a forwarding table.

Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 304 executes instructions suitable to implement any of the techniques described above or below.

Storage 308 may be an electronic storage device that is part of control circuitry 304. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, storage 308 may include forwarding tables, e.g., a MAC table. Multiple circuits may be provided to handle simultaneous processing functions. In some embodiments, device 300 may be a virtual device, wherein components 304, 306, 308, 302 and 310 are virtualized on top of another physical device.

Figure 4:
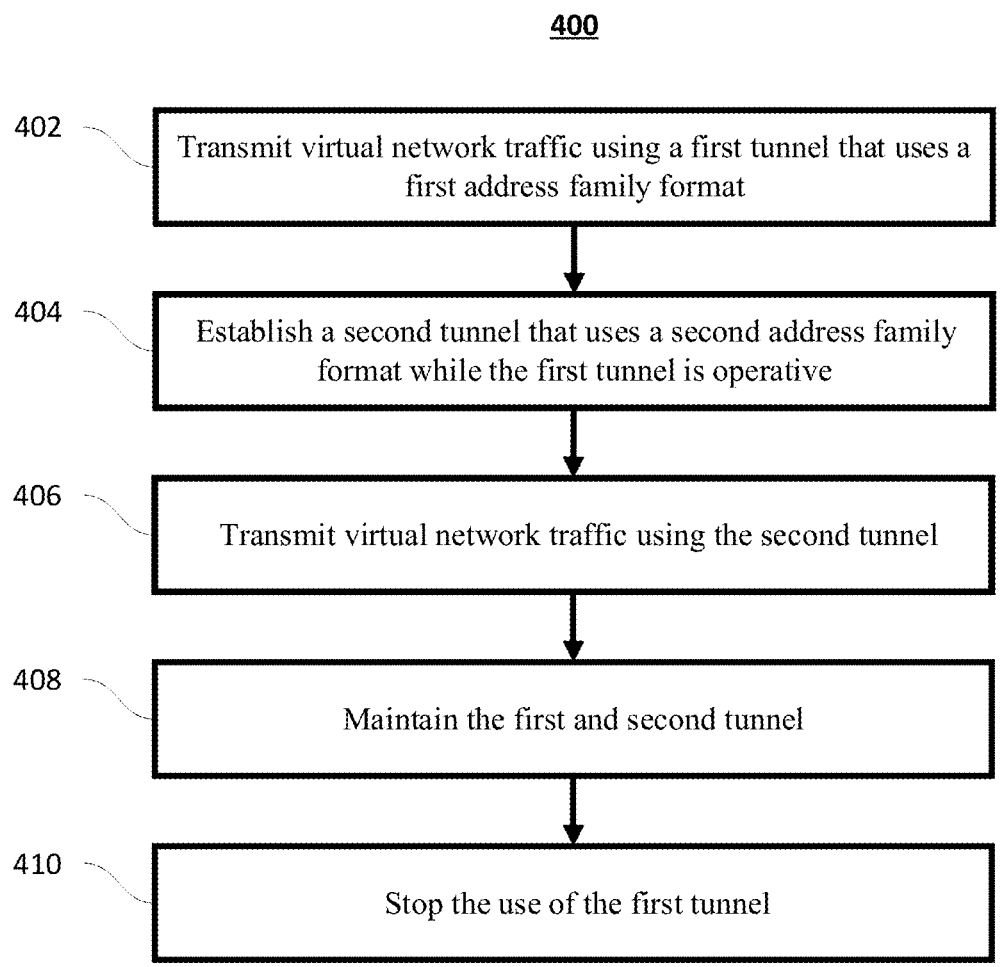
FIG. 4 is a flowchart of an illustrative process for transitioning a transport network in an EVPN environment, in accordance with some embodiments of the present disclosure.

FIG. 4 is a flowchart of an illustrative process for transitioning a transport network in an EVPN environment, in accordance with some embodiments of the present disclosure. Process 400 may be performed by physical or virtual control circuitry, such as control circuitry 304 of device 300 (FIG. 3). For example, process 400 may be performed by control circuitries of devices 102, 106, 202, 206, and 216.

At 402, control circuitry transmits network traffic to a first network device using a first tunnel that uses a first address family format. In an embodiment, the first tunnel is established between two virtual endpoints in the underlay network, where the first tunnel endpoint is the control circuitry and the second tunnel endpoint is said first network device. The first tunnel is an abstraction of L2 routes, which allow for efficient movement of data across a network in the overlay network. The first tunnel can be established after at least two devices, the tunnel endpoints, exchange routing and reachability information. For example, the two devices may use a routing protocol (such as BGP, GOOGLE ESPRESSO, etc.) to exchange routing and reachability information with each other and among other various devices within the EVPN. In some embodiments, the routing and reachability information comprises one or more of an autonomous system (AS) path attribute (such as one or more AS numbers), a route origin path attribute, a BGP nexthop path attribute, a route target, a virtual network identifier (VNI), a VPN label, a BGP community attribute, an extended community attribute, etc. The routing and reachability information can also include MAC/IP routes for the hosts, which are reachable by the tunnel endpoint devices. The routing and reachability information also includes the IP addresses of the tunnel endpoint devices, which advertise the routing and reachability information. These IP addresses are in a particular format (e.g., IPv4, IPv6, etc.). In this example, the exchanged IP addresses for the tunnel endpoint devices are in an IPv4 format. In some embodiments, before network traffic is transmitted via the first tunnel, the tunnel is first authenticated using one or more authentication methods known in the art.

Once the first tunnel is established, control circuitry can transmit network traffic destined for a first host using the first tunnel if the tunnel endpoint provides service to said first host. For example, the control circuitry may receive a network packet from a device such as a second host. The network packet's destination may be the first host. The control circuitry transmits the network packet through the first tunnel to the tunnel endpoint, where the tunnel endpoint is indicated using an IP address in an IPv4 format. The tunnel endpoint receives the network packet from the control circuitry and then routes the network packet to the first host.

At 404, control circuitry establishes a second tunnel that uses a second address family format while the first tunnel is still operative. The second tunnel can be established using the methods as described above in establishing the first tunnel. In an embodiment, the same two devices that were tunnel endpoints for the first tunnel are the same two tunnel endpoints for the second tunnel. In some embodiments, the two tunnel endpoint devices of the first and second tunnels are the same devices, although different devices may be used as tunnel endpoints. In an embodiment, one of the tunnel endpoint devices is a switch or router. The tunnel endpoint devices may need to be configured to support additional IP address formats before the second tunnel is established.

In an embodiment, the first tunnel endpoint, the control circuitry, is configured to switch to a new IP address format (e.g., IPv6). When the first tunnel endpoint switches to the new IPv6 address, it will still be configured to enable receiving network traffic destined for the first tunnel endpoint's old IPv4 address. In an embodiment, this may require additional resources (e.g., increased load, more memory, etc.), but this allows network traffic destined for the control circuitry, using the old IPv4 address, to arrive at and be processed by the control circuitry. For example, if the first network device transmits a network packet to the control circuitry using the old IPv4 address, the control circuitry will still receive and process the network packet. Accordingly, the first tunnel, which was established between the control circuitry and first network device, as discussed above, will be able to continue to function even after the control circuitry switches to the IP address in the IPv6 format.

In an embodiment, the second tunnel endpoint, the first network device, is configured to switch to a new IP address in the IPv6 format. When the first network device switches to the IPv6 address, it will still be configured to enable receiving and routing network traffic destined for the first network device's old IPv4 address. In an embodiment, this may require additional resources, but this allows network traffic destined for the first network device using the old IPv4 address to arrive at and be processed by the first network device. For example, when the control circuitry transmits a network packet to the first network device using the old IPv4 address, the first network device will still receive and process the network packet. Accordingly, the first tunnel 112 will be able to continue to function even after the control circuitry and the first network device switch to the IPv6 format.

In an embodiment, once both the control circuitry and the first network device switch to the IPv6 format, they will establish a second tunnel, where the control circuitry and the first network device are used as virtual endpoints for the second tunnel. In one embodiment, to establish the second tunnel, the virtual tunnel endpoints exchange routing and reachability information among the various devices within the VPN. The routing and reachability information can include MAC/IP routes for the hosts, which are reachable by the devices broadcasting the routes. The routing and reachability information also includes the IP addresses of the devices that are advertising the routing and reachability information. The control circuitry and the first network device use the information received from one another to establish the second tunnel, which uses the IP addresses of the control circuitry and the first network device in an IPv6 format. In some embodiments, before network traffic is transmitted via the second tunnel, the tunnel is first authenticated using one or more authentication methods.

At 406, control circuitry transmits network traffic using the second tunnel. In an embodiment, control circuitry can transmit network traffic destined for a first host, via the second tunnel, to the tunnel endpoint that provides service for said second host. For example, the control circuitry may receive a network packet from a device such as a second host. The network packet's destination may be the first host. The control circuitry transmits the network packet through the second tunnel to the tunnel endpoint, where the tunnel endpoint's IP address uses an IPv6 format, where the network packet is routed to the first host by the tunnel endpoint device.

At 408, control circuitry maintains the first and second tunnel. For example, the control circuitry may receive multiple network packets. If the control circuitry receives a network packet destined for a host serviced by the first network device, control circuitry is able to transmit the network packet to the first network device using the second tunnel, which uses the first network device's IP address in the IPv6 format. In another example, if control circuitry receives a network packet destined for a host serviced by the first network device, control circuitry is able to transmit the network packet to the first network device using the first tunnel, which uses the first network device's IP address in the IPv4 format.

At 410, control circuitry stops using the first tunnel. Either automatically or as the result of a user input, control circuitry will stop routing traffic using the first tunnel, which uses the first network device's IP addresses in the IPv4 format. As a result, the control circuitry will route traffic using only the second tunnel, which uses the first network device's IP address in the IPv6 format. Accordingly, control circuitry will no longer use the first tunnel to transmit network packets. After the first tunnel is not used for a predetermined amount of time (e.g., five minutes, ten minutes, two hours, etc.) or in response to user input, the network resources that support the first tunnel will be reallocated. For example, the control circuitry will no longer have to enable receiving network traffic destined for the control circuitry's old IPv4 address. Accordingly, this may reduce processing power requirements, load requirements, memory requirements, and similar such resource requirements that were needed to support receiving network traffic destined for the control circuitry's old IPv4 address.

The processes described above are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

It will be apparent to those of ordinary skill in the art that methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method comprising:
transmitting network traffic, by a first network device on a virtual private network (VPN), to a second network device using a first tunnel between the first and second network devices, wherein the first and second network devices are virtual endpoints of the first tunnel, and the first tunnel uses a first address family format;
establishing a second tunnel between the first and second network devices, while the first tunnel is operative, wherein the first and second network devices are virtual endpoints of the second tunnel, and the second tunnel uses a second address family format; and
simultaneously maintaining the first tunnel and the second tunnel in operation between the first network device and the second network device for a period of time, wherein one address family format of the first address family format and the second address family format is internet protocol version 4 (IPv4), and the other address family format of the first address family format and the second address family format is internet protocol version 6 (IPv6).

2. The method of claim 1, wherein establishing the second tunnel between the first network device and the second network device further comprises:
authenticating the second tunnel prior to transmitting network traffic using the second tunnel.

3. The method of claim 1, wherein establishing the second tunnel between the first network device and the second network device further comprises:
updating the first network device to support the second address family in addition to the first address family.

4. The method of claim 1, wherein establishing the second tunnel between the first network device and the second network device further comprises:
advertising, by the first network device, MAC/IP routes for a plurality of hosts and a first and second IP address for the first network device, where the first IP address is in an IPv4 format and the second IP address is in an IPv6 format.

5. The method of claim 4, wherein establishing the second tunnel between the first network device and the second network device is in response to a selection by the second network device of the second IP address in the IPv6 format such that the second tunnel uses the IPv6 address family format.

6. The method of claim 4, comprising:
establishing a third tunnel using the IPv4 address family format in response to a selection by a third network device of the first IP address in the IPv4 format such that the third tunnel uses the IPv4 address family format, wherein the first network device and the third network device are virtual endpoints of the third tunnel.

7. The method of claim 1, wherein the first tunnel is a single tunnel and the second tunnel is a single tunnel separate from the first tunnel.

8. The method of claim 1, comprising:
transmitting first network traffic over the first tunnel during the period of time; and
transmitting second network traffic over the second tunnel during the period of time.

9. An apparatus comprising:
control circuitry; and
at least one memory including computer program code for one or more programs, the at least one memory and the computer program code configured to, with the control circuitry, cause the apparatus to perform at least the following:
transmit network traffic to a first network device on a virtual private network (VPN) using a first tunnel, wherein the apparatus and the first network device are virtual endpoints of the first tunnel and the first tunnel uses a first address family format;
establish a second tunnel between the apparatus and the first network device, wherein the second tunnel uses a second address family format and is established while the apparatus transmits network traffic using the first tunnel; and
simultaneously maintain the first tunnel and the second tunnel in operation between the apparatus and the first network device for a period of time, wherein one address family format of the first address family format and the second address family format is internet protocol version 4 (IPv4), and an other address family format of the first address family format and the second address family format is internet protocol version 6 (IPv6).

10. The apparatus of claim 9, wherein the apparatus is further caused, when establishing the second tunnel between the apparatus and the first network device, to authenticate the second tunnel prior to transmitting network traffic using the second tunnel.

11. The apparatus of claim 9, wherein the apparatus is further caused, when establishing the second tunnel between the apparatus and the first network device, to support the second address family in addition to the first address family.

12. The apparatus of claim 9, wherein the apparatus is further caused, when establishing the second tunnel between the apparatus and the first network device, to advertise MAC/IP routes for a plurality of hosts and a first and second IP address for the apparatus, wherein the first IP address is in an IPv4 format and the second IP address is in an IPv6 format.

13. The apparatus of claim 9, wherein the first tunnel is a single tunnel and the second tunnel is a single tunnel separate from the first tunnel.

14. The apparatus of claim 9, the computer program code causing the apparatus to:
 discontinue, subsequent to the period of time, use of the first tunnel; and
 reallocate network resources associated with the first tunnel.

15. A non-transitory computer-readable medium having instructions encoded thereon that when executed by control circuitry cause the control circuitry to:
 transmit network traffic to a first network device on a virtual private network using a first tunnel, wherein the control circuitry and the first network device are virtual endpoints of the first tunnel and the first tunnel uses a first address family format;
 establish a second tunnel between the control circuitry and the first network device, while the first tunnel is operative, wherein the second tunnel uses a second address family format; and
 simultaneously maintain the first tunnel and the second tunnel in operation between the control circuitry and the first network device for a period of time, wherein one address family format of the first address family format and the second address family format is internet protocol version 4 (IPv4), and an other address family format of the first address family format and the second address family format is internet protocol version 6 (IPv6).

16. The non-transitory computer-readable medium of claim 15, wherein execution of the instructions causes the control circuitry, when establishing the second tunnel between the control circuitry and the first network device, to authenticate the second tunnel prior to transmitting network traffic using the second tunnel.

17. The non-transitory computer-readable medium of claim 15, wherein execution of the instructions causes the control circuitry, when establishing the second tunnel between the control circuitry and the first network device, to support the second address family in addition to the first address family.

18. The non-transitory computer-readable medium of claim 15, wherein execution of the instructions causes the control circuitry, when establishing the second tunnel between the control circuitry and the first network device, to advertise MAC/IP routes for a plurality of hosts and a first and second IP address for the control circuitry, wherein the first IP address is in an IPv4 format and the second IP address is in an IPv6 format.

19. The non-transitory computer-readable medium of claim 15, wherein execution of the instructions causes the control circuitry to:
 discontinue, subsequent to the period of time, use of the first tunnel; and
 reallocate network resources associated with the first tunnel.

20. The non-transitory computer-readable medium of claim 15, wherein the first tunnel is a single tunnel and the second tunnel is a single tunnel separate from the first tunnel.

* * * * *